United States Patent [19]

Thompson et al.

[11] 4,344,068
[45] Aug. 10, 1982

[54] CODING SCHEMES FOR ACOUSTIC DELAY LINE DATA COLLECTION SYSTEM

[75] Inventors: David A. Thompson, South Salem; Thomas K. Worthington, Tarrytown, both of N.Y.

[73] Assignee: International Business Machines Corporation, Armonk, N.Y.

[21] Appl. No.: 43,610

[22] Filed: May 29, 1979

[51] Int. Cl.³ .............................................. G06F 3/02
[52] U.S. Cl. ............................ 340/365 L; 178/17 C; 333/148; 340/365 S
[58] Field of Search ........... 340/365 R, 365 A, 365 L, 340/365 S; 178/17 C; 179/90 K; 400/477, 479, 479.1, 479.2; 324/207, 208, 226; 333/148; 365/157

[56] References Cited

U.S. PATENT DOCUMENTS 4,071,818 1/1978 Krisst .................................. 333/148
4,298,861 11/1981 Tellerman ....................... 340/365 L

FOREIGN PATENT DOCUMENTS 896714 5/1962 United Kingdom ................ 333/148
395829 1/1974 U.S.S.R. ........................... 340/365 L

OTHER PUBLICATIONS

IBM Technical Disclosure Bulletin, Lisk, vol. 20, No. 1, Jun. 1977, p. 259.
IBM Technical Disclosure Bulletin, Thompson et al., vol. 22, No. 12, May 1980, pp. 5561-5564.
IBM Technical Disclosure Bulletin, Martin, vol. 6, No. 5, Oct. 1963, p. 54.
IBM Technical Disclosure Bulletin, Arosenius, vol. 14, No. 10, Mar. 1972, p. 3199.
IBM Technical Disclosure Bulletin, Calcagno et al., vol. 21, No. 9, Feb. 1979, pp. 3843-3844.
IBM Technical Disclosure Bulletin, Booth et al., vol. 20, No. 10, Mar. 1978, p. 4188.

*Primary Examiner*—James J. Groody
*Attorney, Agent, or Firm*—Graham S. Jones, II

[57] ABSTRACT

A magnetoacoustic system adapted to use as a keyboard can employ a serpentine acoustic delay line passing under a number of transducers which are activated simultaneously with a current pulse through the wire. Magnets adjacent to the wire generate magnetoacoustic pulses along the wire which arrive sequentially at a sensor at one end of the line. For each key on a keyboard at least two magnets are associated with each key position with one magnet affixed in position and one reciprocably movable towards and away from the wire in a response to actuation of the key. The magnet which remains close to the wire is used to provide a "location" signal indicating the location along the delay line provided by the wire by producing an acoustic pulse for that point on the wire for each clock pulse of current which passes through the wire. The second magnet located adjacent to the first magnet generates a pulse simultaneously with the other magnets when the current pulse passes through the wire, but it is delayed by the physical displacement along the wire, so it is received at a different time than the pulse from the other magnet. The data pulse can follow or precede the location pulse so long as the presence of one or both can be readily decoded. A three magnet key arrangement can be employed where it is desired to be able to use three positions per key.

10 Claims, 7 Drawing Figures

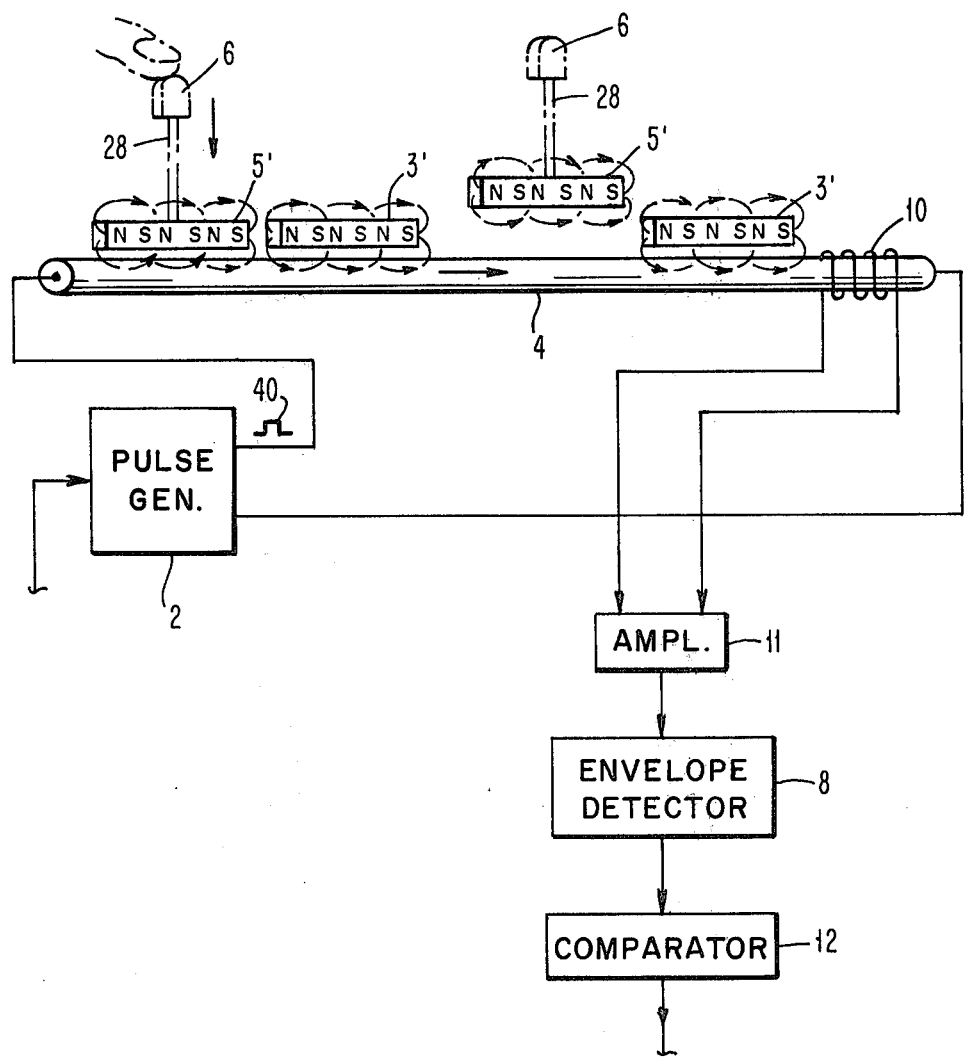
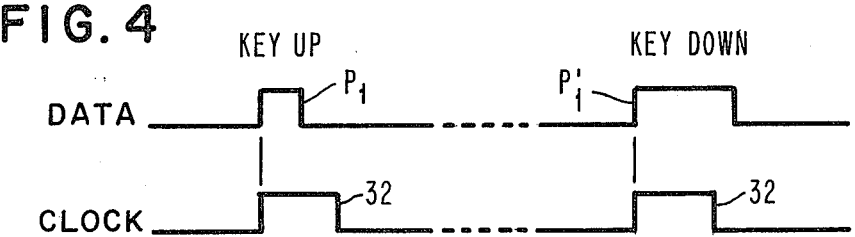

CODING SCHEMES FOR ACOUSTIC DELAY LINE DATA COLLECTION SYSTEM

DESCRIPTION

1. Technical Field

This invention relates to magnetoacoustic data collection and more particularly to magnetoacoustic keyboards and the like.

An object of this invention is to provide accurate control of decoding acoustic signals encoded on a delay line independent of external variations in temperature and the like.

Another object of this invention is a keyboard which is capable of identifying positively the origin of each data bit received.

2. Background Art

In the prior art it has been known to send magnetoacoustic pulses along a magnetostrictive line in response to motion of permanent magnets towards the line to change the magnetic field therein during application of an electrical signal to the ends of the wire to generate a circumferential magnetic field about the wire. The problem with that type of system has been that the time required for a signal to propagate along the wire varies as a function of temperature and other factors which has led to errors in the past. Accordingly, this invention is directed to overcoming such errors by providing more positive identification of the source of the signals received at the output end of the wire.

BRIEF DESCRIPTION OF THE DRAWINGS

In the accompanying drawings forming a material part of this disclosure:

FIG. 3 shows a modified form of the diagram of FIG. 1 with the magnets extended to produce a pulse burst of energy propagated down the line for each key position and with an envelope detector which provides an input to the electronics varying with the position of the key in question.

FIG. 4 is a pulse timing representation similar to FIG. 2 for the diagram of FIG. 3.

DISCLOSURE OF INVENTION

For further comprehension of the invention, and of the objects and advantages thereof, reference will be had to the following description and accompanying drawings, and to the appended claims in which the various novel features of the invention are more particularly set forth.

Figure 1:
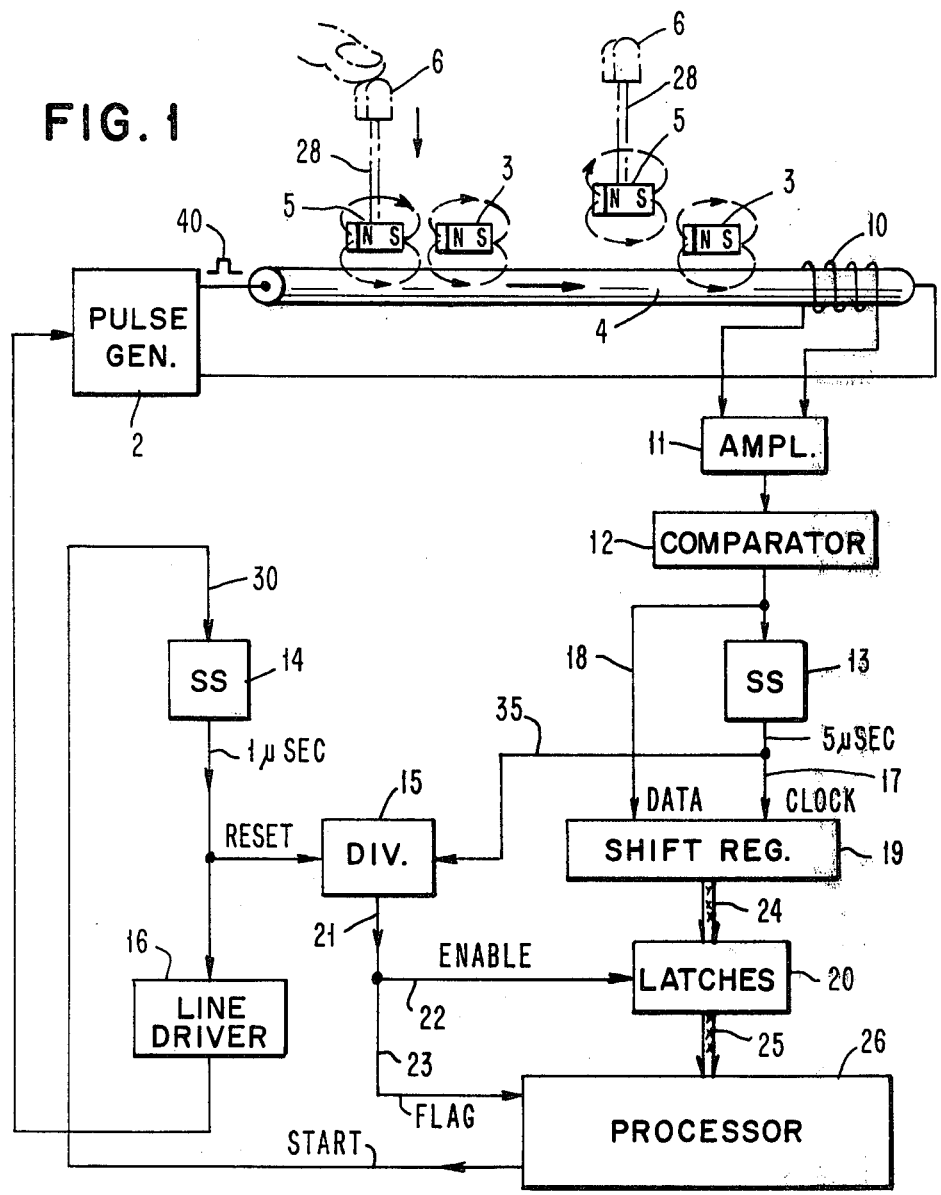
FIG. 1 is an electrical schematic diagram and a mechanical diagram of a keyboard system in accordance with this invention.
Figure 2:
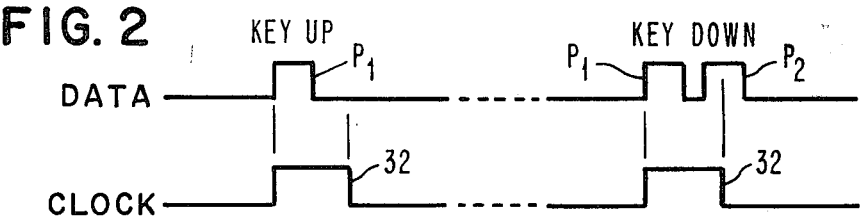
FIG. 2 is a pulse timing representation of magnetoacoustic pulses and electrical clock pulses as a function of time with the upper line showing data received at the shift register in FIG. 1 and the lower line showing the electrical clock pulse applied to the wire in FIG. 1.

The magnetoacoustic keyboard in FIG. 1 is a fragment of a keyboard which consists of a single magnetostrictive wire 4 formed in a serpentine shape (not shown for convenience of illustration) in order that it can pass under every key location on the keyboard and serve as a delay line. Under each key 6 is secured a movable magnet 5 by means of a mechanical linkage 28 shown in phantom. (The magnets 3 and 5 are preferably permanent magnets but they can be electromagnets or a mixture of both.) Adjacent to each of the movable magnets 5 is located another location indicating magnet 3 which is affixed in a permanent position immediately next to the wire 4 to indicate the key location along the delay line. Clock pulses 40 (FIG. 2) are generated by generator 2 and applied to wire 4 for interrogation of the keyboard by driving an electrical current through wire 4 which produces a circumferential magnetic field which extends simultaneously along the full length of wire 4. In the absence of any magnets 3 or 5, the magnetic state of wire 4 is such that the presence of the circumferential magnetic field about wire 4 produces no magnetostrictive interaction. However, with magnets such as 3 and 5 adjacent to the wire 4 and correctly oriented with respect to wire 4, whenever the circumferential magnetic field is present each magnet 3 or 5 generates a torsional acoustic wave $P_1$ or $P_2$ respectively (FIG. 2), which travels down along wire 4 to pickup coil 10 wound about wire 4. Motion of magnet 5 from the correctly oriented actuating position alters the field seen by wire 4 and eliminates or changes the acoustic wave $P_2$ when it is moved. Rotation, or reciprocation as shown in FIG. 1, produces this effect. It is obvious that a mechanical key mechanism can retract or extend a magnet's position in response to actuation. The acoustic waves $P_1$ and $P_2$ travel at about the shear velocity of sound (about 2,500 m/sec.). The time delay from the time that the clock pulse establishes the current through wire 4 to the arrival of the pulse at coil 10 reveals which key 6 on the keyboard was operated.

Wire 4 can be manufactured by plating a stretched wire in a circumferential or longitudinal magnetic field with a magnetostrictive material. For example, one can employ a 250 micrometer $BeCu_2$ wire plated with a 2 micrometer thick 50:50 NiFe plating, and fabricated with a circumferential easy axis.

It has been found in the past that a single movable magnet (5) per key system can fail to provide accurate readings in cases in which there are external clock synchronization problems. Such problems arise as a result of variations in the velocity of propagation of the acoustic energy on a wire 4 with temperature and other similar variations. Accordingly, the location indicating magnets 3 provide signals which in combination with cooperating electronic circuits permit the self-clocking operations to eliminate dependency on invariability of propagation velocity, etc.

The terminal control unit includes a START line 30 from processor 26 to single shot 14 with a 1 microsecond activation time which produces an output on line 29 to reset a divide by eight circuit 15 and activates line driver 16 which causes pulse generator 2 to energize wire 4 causing a current pulse in wire 4. Acoustic pulses are generated all at the same time at the various magnets along the wire 4, but they arrive at the sensor coil 10 as a series of acoustic pulses from key 6. The pulses pass from coil 10 to amplifier 11 to comparator 12 to single shot 13 which has a 5 microsecond activation time and which clocks shift register 19 via line 17 on a falling edge of the clock output 32 of single shot 13. At this time, if the key 6 were down, another "data" pulse $P_2$ has arrived and the comparator 12 is again in the "1" condition. Single shot 13 remains on so it is not retriggered and a "1" is entered into the shift register 19 via line 18 into the data input of the serial to parallel shift register 19 as the clock signal 32 from single shot 13 falls. If key 6 and its magnet 5 had been up, a "0" would have been entered into the shift register 19. After pulses from eight keys have been received by coil 10 and single shot 13, etc. the outputs on line 35 which have been passing to divider 15 are operative to cause divider 15 to produce an output on line 21 to enable latches 20 and to flag processor 26 on line 23. The latches 20 retain the value received from shift register 19 on cable 24 and pass it on immediately to processor 26 via cable 25. The minimum time for an acoustic pulse to move from key to key has been selected to be 8 microseconds in the preferred embodiment so in that case the processor 26 has 64 microseconds to store the eight bits and prepare for the next byte.

The advantage of this technique is that the timing is done over a much shorter scale, ~5 $\mu$sec, so that a timing accuracy of $\pm 0.5$ $\mu$sec or $\pm 10\%$ is adequate. This accuracy is easily achievable with TTL circuits.

Another way to implement this technique shown in FIGS. 3 and 4 is to position multipole magnets 3' and 5' and design the pickup coil (see FIG. 7) in such a way as to generate a pulse burst whose width changes when the key 6' is depressed. This burst is envelope detected by envelope detector 8 which rectifies and smooths the signal so that the output of the comparator 12 is a single pulse whose width varies rather than two separate pulses. The decoding electronics are otherwise the same as in FIG. 1.

The magnets 3' and 5' are located near each other (along the length of the wire 4) though a gap is required between them when key 6' is depressed for mechanical clearance. Also, the magnetic field is sufficiently diffused at the gap so that the permissible space between magnets 3' and 5' (along wire 4) when key 6' is depressed can be substantial, so long as pulse $P_1'$ does not show a substantial dip between its leading and trailing edges so that it changes the output of envelope detector 8 from a single square wave to separated square waves for a single key position. It should be understood that the north and south pole pairs cause sine wave patterns to be propagated down the wire 4 with one wave cycle for each pair. Thus, if magnet 5' is raised and, of course, magnet 3' is in place, then a set of three acoustic wave cycles of energy propagate down wire 4. If the magnet 5' is depressed to interact with wire 4, then six wave cycles are propagated down the wire 4. In each case, the envelope detector 8 produces a corresponding square wave which varies in length as a function of the duration of the burst, which is the means by which this form of signal is encoded. The multiple pole magnets 3' and 5' can be formed by cutting strip magnet material into segments with north and south poles and securing them to a substrate by means of bonding material such as an epoxy. Alternatively, the magnetic material of the magnets 3' and 5' can be strips of magnetizable material which is subjected to magnetization by a number of loops of wire of U-shape parallel to each other connected in series which are energized with a strong electrical current so as to from a series of several north and south poles in series.

The advantage of the pulse width scheme is that it does not matter in which orientation the pulse arrives, i.e., one can not tell whether the pulse $P_1'$ is longer at the beginning or the end of the pulse $P_1$. Since the wire 4 is bent in a serpentine form, it would be necessary to reverse the order of the fixed and moving magnets in every row if the separate pulse scheme were used.

The multimagnet scheme can also be extended to three magnets per key to allow automatic repeat and multifunction keys with two levels of depression to be implemented. The magnets are positioned such that the output is 100, 110 or 111 depending whether the key is up, key down, or automatic repeat down. A scheme of 100, 110, 101 can also be used, among others.

Figure 5:
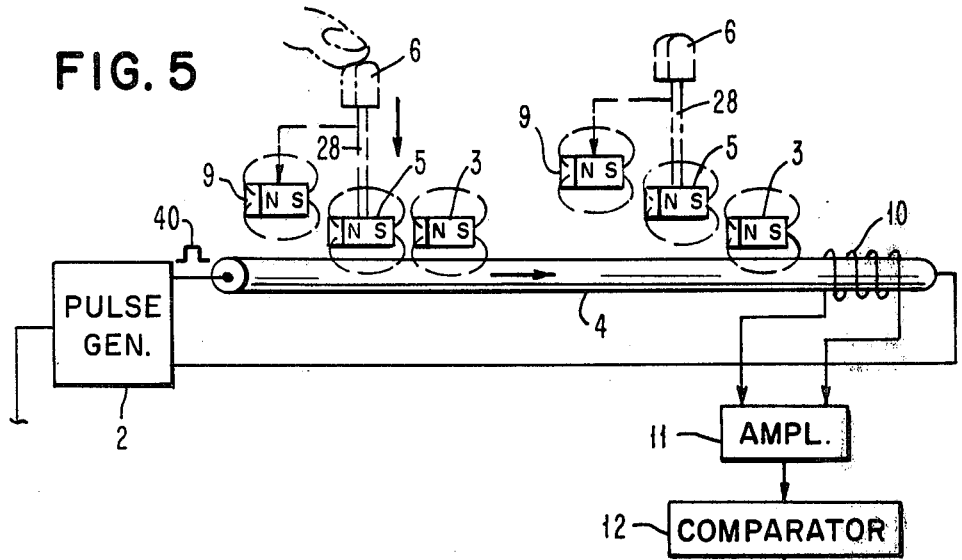
FIG. 5 is a diagram similar to FIG. 1 for a three position key with two magnets attached to it for sequential actuation and a third fixed magnet.
Figure 6:
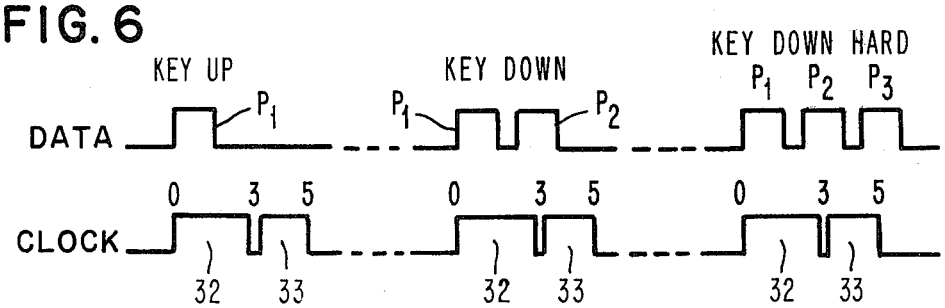
FIG. 6 is a pulse timing representation similar to FIG. 2 for the device of FIG. 5.

FIG. 5 shows an arrangement of three magnets per key 6, which is a modification of FIG. 1 for the case in which a key can be pressed down to two different positions or pressures to produce two different values. Magnets 3 and 5 are the same but for each key 6 there is a third magnet 9 which is also movable like magnet 5. The additional magnet 9 for each key 6 is moved by means of a mechanical linkage 28 between key 6 and magnets 5 and 9 which has the feature of actuating magnet 5 first and then actuating magnet 9 later, if and only if an additional actuation force is applied by pushing key 6 down farther or harder or the like. As with FIG. 1, the magnets 3, 5 and 9 generate acoustic pulses yielding $P_1$, $P_2$ and $P_3$ respectively, (FIG. 6 which show the squared outputs of comparator 12 as $P_1$, $P_2$ and $P_3$) which arrive at the sensor coil 10 as a series of acoustic pulses with the pulses $P_1$ from the location indicating magnets 3 leading pulses $P_2$ from magnets 5 and pulses $P_3$ which come last from any key position as shown in FIG. 6. The pulses pass from coil 10 to amplifier 11 and comparator 12 into single shot 13 which clocks shift register 19 via OR 32 on a falling edge of the output pulse 32 of single shot 13, after 3 microseconds from time t=0 as shown in FIG. 6, which is about the middle of pulse $P_2$ from magnet 5. Thus, if the key 6 were down, the pulse $P_2$ would have arrived and the comparator 12 would be in a "1" condition so a signal $P_2$ on line 18 would be admitted as data since the OR is on during pulse $P_2$, when the clock input pulse 32 falls at 3 microseconds after t=0. Next, the single shot 31 is triggered by the fall of the output pulse 32 of single shot 13 and after two additional microseconds, when t=5 microseconds, the output of single shot 31 output pulse 33 falls producing a fall in the output of OR 36 which clocks shift register 19 again to open its data input 18 for the second data bit $P_3$ if any such pulse is received by coil 10 from a magnet 9 at t=5.

Figure 7:
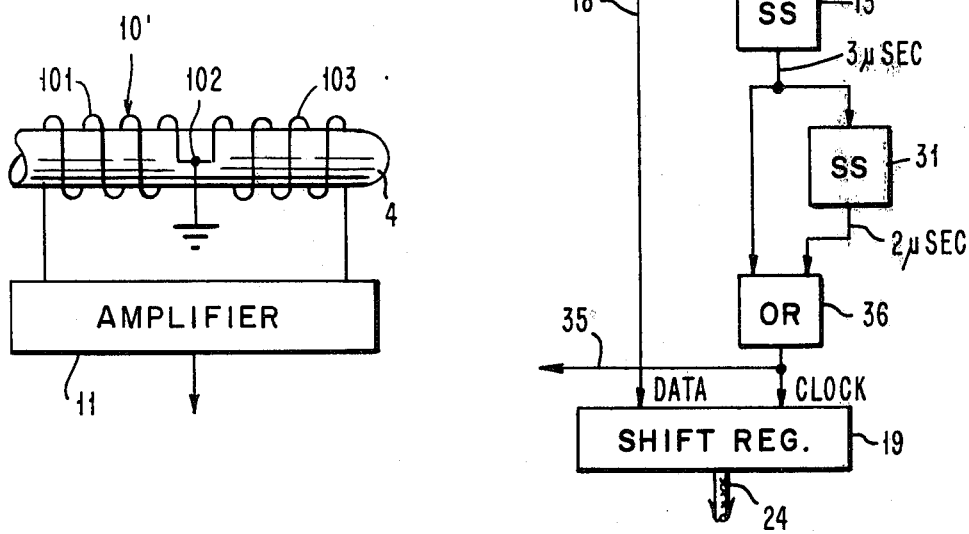
FIG. 7 is a schematic diagram of a modified winding arrangement for the sensor coil in FIGS. 1, 3, and 5.

FIG. 7 shows a modified form of coil 10' used in place of coil 10. Coil 10' includes a section 101 wound as a right-handed helix about wire 4. On the other hand, the section 103 of coil 10' is wound as a left-handed helix. The two sections are joined at point 102 to ground, if desired. The advantage of this coil is that it discriminates against the longer A.C. wavelengths such as 60 cycle hum in the environment of the coil. The length of one section is comparable to the space between the poles on the magnets.

INDUSTRIAL APPLICABILITY

This invention is adapted to keyboard systems in that it provides a self-clocking means which eliminates dependencies on variations of velocity of propagation of acoustic energy on a wire with temperature and other factors.

While this specification illustrates and describes the preferred embodiments of the subject invention, it is to be understood that the invention is not limited to the precise implementation and construction details described herein. The right is reserved to all changes and modifications encompassed by the scope of the underlying invention as defined in the claims which follow.

Having thus described our invention, what we claim as new, and desire to secure by Letters Patent is:

1. In a magnetoacoustic sensor delay line system including a delay line and a plurality of data positions with a movable data magnet and a key coupled thereto associated with each of said data positions, with said data positions being periodically activated by pulse means simultaneously for propagation of a series of data signals along said delay line to a sensor, the improvement comprising provision of at least a pair of magnets at each of said data positions with a first location indicating one of said magnets in a fixed position and a second data magnet thereof movable with respect to said delay line, whereby said location magnet provides a location indicating signal and each said data magnet can, as a function of key actuation, provide a data signal adjacent to each of said location indicating signals.

2. A system in accordance with claim 1 wherein said magnets are permanent dipole magnets, with said second data magnet and a key biased to a mechanical position spaced away from said line, for each of said data positions, said line comprises a magnetostrictive wire, and a pulse generator coupled to said line and a pickup coil coupled to said line positioned at one end of said wire with respect to said magnets for receiving a series of signals therefrom.

3. A system in accordance with claim 1 wherein said dipoles of said magnets are aligned substantially parallel with the axis of said line.

4. A system in accordance with claim 1 or 3 wherein each of said first and second magnets includes a plurality of dipoles in a serial array to provide a pulse burst for each magnet,
   and including a pickup coil coupled to the delay line of said delay line system, and an envelope detector coupled to the output of said pickup coil.

5. In a magnetoacoustic sensor delay line system including a delay line, the improvement comprising provision of at least a pair of position magnets at each data position with a first of said magnets in a fixed position and a second data magnet thereof movable with respect to said delay line, whereby said first fixed magnet provides a synchronization signal and each of said data magnets can, as a function of key actuation, provide a data signal adjacent to said synchronization signal, wherein a plurality of said second movable data magnets are associated with each data position, and a key is associated with each of said data positions, and said data magnets for each of said data positions are differentially movable by mechanical interconnection with a said key, a pickup coil coupled with said delay line of said delay line system and means for receiving a plurality of said data signals for each synchronization signal, said means for receiving being coupled to the output of said pickup coil.

6. A system in accordance with claim 1 wherein a plurality of said second movable data magnets are associated with each of said data positions and said data magnets for each of said data positions are differentially movable by mechanical interconnection with said key, a pickup coil coupled with said delay line of said delay line system and means adapted for receiving a plurality of said data signals for each said location indicating synchronization signal, said means for receiving being coupled to the output of said pickup coil.

7. In a magnetoacoustic sensor delay line system including a delay line, an electrical current pulse generator coupled to said delay line, movable magnets spaced along said delay line for selectively generating magnetoacoustic data signals when in proximity to said delay line and a sensor coupled to said delay line for receiving said magnetoacoustic data signals, the improvement comprising provision of at least a pair of magnets at each of said data positions with a first one of said magnets located in a fixed position and a key and a second data magnet thereof movable with respect to said delay line said key coupled to said second magnet for movement thereof by key actuation, whereby a said first magnet provides a location indicating signal on said delay line and each said data magnet can, as a function of key actuation, provide a data signal on said delay line traveling adjacent to each of said location indicating signals; so timing errors attributable to variable transmission speed resulting from varying environmental conditions can be averted by a said location indicating signal for each data position to gate said data signals.

8. A system in accordance with claim 1, or 7, wherein a plurality of said movable second data magnets is associated with each data position for selectively providing a single or a plurality of said data signals, and a said key associated with each of said data positions, and said second data magnets for each of said data positions are differentially movable by mechanical interconnection with a said key to provide a separate data pulse in response to depression of said key partially and a plurality of data signals in response to depression of said key farther, and means adapted for receiving a plurality of said data signals accompanying each said location indicating signal, said means for receiving being coupled to the output of said sensor.

9. A system in accordance with claim 1 wherein each of said first and second magnets includes a plurality of dipoles in a serial array.

10. A system in accordance with claim 1, 5, or 7 wherein said delay line comprises a magnetostrictive wire and pulse means associated therewith which comprises an apparatus which produces an electrical current pulse through said magnetostrictive wire to generate a circumferential magnetic field extending along the full length of said wire.

* * * * *